(12) United States Patent
Norton

(10) Patent No.: US 6,985,352 B2
(45) Date of Patent: Jan. 10, 2006

(54) CAPACITORS INCLUDING TRACK-ETCHED SEPARATOR MATERIALS

(75) Inventor: John D. Norton, New Brighton, MN (US)

(73) Assignee: Medtronic, Inc., Minneapolis, MN (US)

( * ) Notice: Subject to any disclaimer, the term of this patent is extended or adjusted under 35 U.S.C. 154(b) by 97 days.

(21) Appl. No.: 10/618,047

(22) Filed: Jul. 11, 2003

(65) Prior Publication Data

US 2004/0246657 A1 Dec. 9, 2004

Related U.S. Application Data

(60) Provisional application No. 60/474,800, filed on May 30, 2003.

(51) Int. Cl.
*H01G 9/00* (2006.01)

(52) U.S. Cl. .................. 361/523; 361/520; 361/524; 361/525; 361/528; 361/502; 361/503; 29/25.03

(58) Field of Classification Search ............... 361/523, 361/524, 525, 528, 529, 520, 502, 503, 504, 361/508, 509, 516; 29/25.03
See application file for complete search history.

(56) References Cited

U.S. PATENT DOCUMENTS

| | | | |
|---|---|---|---|
| 3,303,805 A | 2/1967 | Steiner et al. | |
| 3,493,751 A | 2/1970 | Davies et al. | |
| 3,612,871 A | 10/1971 | Crawford et al. | |
| 3,661,645 A | 5/1972 | Strier et al. | |
| 3,662,178 A | 5/1972 | Caputi et al. | |
| 3,673,017 A | 6/1972 | Peterson et al. | |
| 3,677,844 A | 7/1972 | Fleischer et al. | |
| 3,713,921 A | 1/1973 | Fleischer et al. | |
| 3,802,972 A | 4/1974 | Fleischer et al. | |
| 3,852,134 A | 12/1974 | Bean | |
| 4,480,290 A | 10/1984 | Constanti et al. | |
| 4,593,343 A | 6/1986 | Ross | |
| 4,633,373 A | 12/1986 | Phillips | |
| 4,830,940 A | 5/1989 | Keister et al. | |
| 4,855,049 A | 8/1989 | Toulemonde et al. | |
| 4,876,451 A | 10/1989 | Ikeda et al. | |
| 4,956,219 A | 9/1990 | Legras et al. | |
| 5,139,624 A | 8/1992 | Searson et al. | |
| 5,157,586 A | 10/1992 | Lallemand | |
| 5,415,959 A | 5/1995 | Pyszczek et al. | |
| 5,449,917 A | 9/1995 | Clements | |
| 5,850,331 A * | 12/1998 | Matsumoto et al. | ........ 361/502 |
| 5,914,150 A | 6/1999 | Porter et al. | |
| 6,006,133 A | 12/1999 | Lessar et al. | |
| 6,048,607 A | 4/2000 | Hashimoto et al. | |
| 6,058,006 A | 5/2000 | Yoshioka et al. | |
| 6,120,875 A | 9/2000 | Haumont et al. | |
| 6,130,005 A | 10/2000 | Crespi et al. | |
| 6,275,729 B1 | 8/2001 | O'Phelan et al. | |
| 6,740,447 B1 * | 5/2004 | Keshishian | ................. 429/178 |

* cited by examiner

*Primary Examiner*—Dean A. Reichard
*Assistant Examiner*—Nguyen T. Ha
(74) *Attorney, Agent, or Firm*—Girma Wolde-Michael; Carol F. Barry; Paul H. McDowall

(57) ABSTRACT

The present invention relates generally to capacitor cells and the utilization of enhanced separator materials in such cells. More specifically, the present invention is related to the utilization of track-etched materials as the separator materials in capacitor cells. Methods of making a capacitor cell having a track-etched separator material is also disclosed.

5 Claims, 7 Drawing Sheets

CAPACITORS INCLUDING TRACK-ETCHED SEPARATOR MATERIALS

CROSS REFERENCE TO RELATED APPLICATION

This patent disclosure claims the benefit of prior provisional U.S. patent application Ser. No. 60/474,800, invented by Norton et al., filed 30 May 2003, and entitled, "Capacitor Cells Including Enhanced Separator Systems and Materials"—the contents of which are fully incorporated herein.

FIELD OF THE INVENTION

The present invention relates generally to capacitor cells and the utilization of enhanced separator materials in such cells. More specifically, the present invention is related to the utilization of track-etched separator materials for capacitor cells.

BACKGROUND OF THE INVENTION

Capacitor cells, such as batteries and capacitors, are particularly useful in various implantable medical devices, such as implantable defibrillators. Implantable defibrillators are implanted into the chests of patients prone to suffering ventricular fibrillation, a potentially fatal heart condition. Batteries and capacitors are critical components in these devices because they store and deliver one or more life-saving bursts of electric charge to a fibrillating heart. Specifically, lithium batteries and electrolytic capacitors are commonly used in implantable defibrillators. One drawback with current batteries and capacitors is that they are often large in size, which in turn causes the total size of the defibrillator to be relatively large in size. A patient who has such a device implanted may be bothered by the presence of such a large object in the chest area. Thus, it would be desirable to produce a smaller and more compact capacitor cells for use in implantable medical devices.

One important component in capacitor cells is the separator. Capacitor cells typically comprise an anode, a cathode, a separator, and an electrolyte solution. The anode serves as the positive source of energy and the cathode serves as the negative source of energy. The separator is a nonconductive dielectric that serves to keep the anode and cathode separate from one another. Separation of the anode and cathode is necessary to prevent short circuiting. The electrolyte is an ionic solution that interacts with the anode to form a dielectric oxide layer thereon. The dielectric oxide layer serves to insulate the anode from the surrounding electrolyte solution, allowing for charge to accumulate. The energy of the capacitor cell is stored in the electromagnetic field generated by the opposing electrical charges separated by the dielectric layer disposed on the surface of the anode.

Separators are generally made from a roll or sheet of separator material, and a variety of separator materials have been found to be effective. Paper, particularly Kraft paper, is a cellulose-based separator material that is commonly used. Cellulose separator materials are manufactured with high chemical purity. Metalized paper and paper & foil constructions are useful variants of cellulose-based separators.

A common alternative to paper separators are polymeric separators. Generally, polymeric separators are either made of microporous films or polymeric fabric. An example of a microporous film separator is a separator comprising polytetrafluoroethylene, disclosed in U.S. Pat. No. 3,661,645 to Strier et al. U.S. Pat. No. 5,415,959 to Pyszeczek et al., on the other hand, describes the use of woven synthetic halogenated polymers as capacitor separators. The use of "hybrid" separators comprising polymer and paper material has also been described. See, for example, U.S. Pat. No. 4,480,290 to Constanti et al., which describes the use of separators including a porous polymer film made from polypropylene or polyester and absorbent paper.

While paper and polymeric separators have been satisfying in use, several drawbacks still remain. One drawback is that current separator materials are often very thick. The use of thick separator materials makes it difficult to manufacture capacitors having decreased sizes. For example, the total thickness of cellulose separators employed between anode and cathode plates will vary with the voltage rating of the capacitor structure and the type of electrolyte employed, but on the average, the thickness varies from 0.003 inches to 0.008 inches in connection with capacitors rated at from 6 volts to 600 volts, respectively. If the thickness of the separator material can be decreased, the diameter and volume of the capacitor elements can be decreased, which would reduce the space necessary to contain the capacitors. Thus, it would be desirable to employ a thinner separator material to reduce the space necessary to contain a capacitor.

A further difficulty with prior separators is that they do not have strong enough tensile properties. A separator with strong tensile properties is desirable because it is less likely to tear or break during fabrication of the capacitor cell. Strong tensile properties are also desirable because they are more able to withstand internal stresses in the capacitor cell due to changes in the anode and cathode volumes during discharge and re-charging cycles. Single sheets of paper separator materials alone do not have strong tensile properties. Rather, the paper separators are often made thick in order to increase its tensile properties. However, thick paper separators are undesirable, as more space is needed to contain the capacitor. Likewise, microporous polymeric films can also be made very thin which contributes to volumetric efficiency of the capacitor, but this reduction is thickness is accompanied by a reduction in strength.

Another drawback with prior separators is that separator materials often unpredictably swell or expand when impregnated with liquid electrolyte. This swelling often causes the remaining capacitor elements to be pushed outward, which often results in swelling of the capacitor enclosure. The swelling may also cause damage to capacitor elements, rendering the capacitor dysfunctional. In order to account for this swelling, a larger-sized capacitor enclosure is sometimes used, again causing an undesirable increase in the amount of space needed to contain the capacitor. Thus, it would be desirable to employ a separator material that is resistant to swelling when impregnated with electrolyte.

A yet another drawback with prior separators is that porosity is not precisely controlled. Typically, a separator material should have a porosity small enough to maintain enough separation so that the electrical resistivity is sufficiently high to prohibit short circuit current from flowing directly between the anode and cathode. The inventors have discovered that the tortuosity of the separator material also affects ionic transport through the working electrolyte; for example, a separator material having on average relatively non-tortuous paths through the separator appears to possess superior performance as compared to a high tortuosity separator material. Likewise, the porosity should be high enough to allow the ions within the electrolyte to be transferred through the separator material. The ideal porosity of a given separator material depends on the specific capacitor and components used therewith. While porous polymers are currently used as separator materials, it has often been difficult to precisely control their porosity so that separator performance can be optimized. Factors influencing porosity include pore size, shape, density, and distribution. Thus, it would be desirable to employ a separator material that has a precise porosity that would be ideal for used with a particular capacitor cell.

In addition to overcoming the above drawbacks, an ideal separator material will also be resistant to degradation in the cell environment and exhibit surface energy such that electrolyte wettability and absorption are augmented. Therefore, it would be desirable to employ in electrolytic capacitors and other capacitor cells a separator material that is sufficiently thin, has strong tensile properties, is resistant to swelling, is resistant to degradation in the cell environment, and has a precise porosity sufficient for use with a particular capacitor cell.

BRIEF DESCRIPTION OF THE DRAWINGS

The above and other objects and aspects of the invention will be apparent from the description of embodiments illustrated by the following accompanying drawings.

SUMMARY OF THE INVENTION

Figure 1:
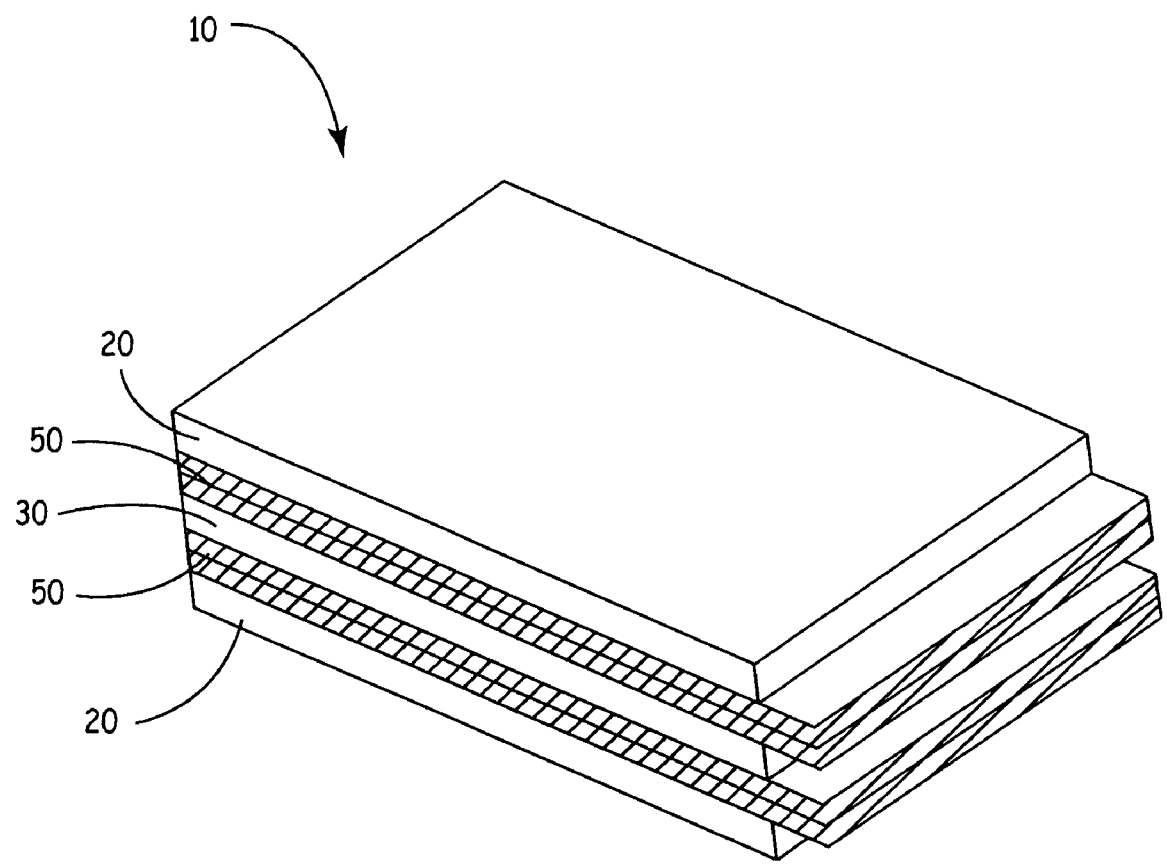
FIG. 1 depicts a top perspective view of a portion of an anode/separator/cathode laminate.

The present invention provides a capacitor cell having separator materials that have been track-etched. The inventors have discovered that track-etched materials serve as excellent separators in capacitor cells. Particularly, polymeric materials that have been track-etched are especially desirable as they are sufficiently thin, have strong tensile properties, are resistant to swelling, and have a precise porosity sufficient for use with a particular capacitor cell. The term "capacitor cell" is used herein to refer to any compartment containing electrodes and electrolyte for generating or storing electrical energy.

In preferred embodiments, the present invention includes a capacitor cell comprising anode material, cathode material, an electrolyte operatively associated with the anode material and the cathode material, and a separator material comprising track-etched materials. The track-etched separator material is provided in between the anode material and the cathode material to prevent internal electrical short circuit conditions and to allow sufficient movement of the electrolyte within the cell.

In preferred embodiments, the track-etched separator materials comprise track-etched polymeric materials. In particularly preferred embodiments, the track-etched separator materials comprise track-etched polycarbonate material.

In certain embodiments, the anode material, the cathode material and the track-etched separator material are configured as one or more strips adhered together as a laminate. The laminate can be arranged in a coiled configuration or a stacked configuration. A laminate arranged in a coiled position can further be arranged in either a cylindrical coiled position or a flat coiled position.

In other embodiments, the anode material, the cathode material and the track-etched separator material are each configured as one or more layers. The one or more layers can be configured as a stack of layers. Likewise, the stack of layers may comprise separator layers positioned in between alternating anode and cathode layers.

The present invention also provides methods of making a capacitor cell. In one embodiment, the method comprises providing track-etched material, anode material, and cathode material and positioning the track-etched material in between the anode material and the cathode material. The materials may then be placed within an enclosure. The enclosure is filled with electrolyte and subsequently sealed.

DETAILED DESCRIPTION OF THE PREFERRED EMBODIMENTS

The present invention comprises a separator for use in a capacitor cell that comprises track-etched material. In various embodiments of the present invention, the separator comprises a track-etched polymer. In preferred embodiments, the separator comprises a track-etched polycarbonate. Typically, track-etched membranes are formed by bombarding a film of material with energy particles that form tracks of damaged material through the film. The film is then subjected to a chemical agent that selectively etches the damaged tracks to create pores through the film.

The track-etching process is well known in the art and many variations of the process exist. Examples of processes for forming track-etched membranes are disclosed in U.S. Pat. Nos. 3,303,805; 3,493,751; 3,612,871; 6,120,875; 3,662,178; 3,673,017; 3,677,844; 3,713,921; 3,802,972; 3,852,134; 4,855,049; 4,956,219; 5,139,624; 5,449,917; 5,914,150, the entire contents of each of which are incorporated herein by reference. The separator material of the present invention can be comprised of any material that has been track-etched according to any of the processes disclosed in the references above or according to any known track-etching process.

While the material that is track-etched can be any known material that is capable of being track-etched, in preferred embodiments, the separator material comprises a polymeric material. Polymeric materials include but are not limited to polyesters, polystyrenes, aromatic polyesters, polycarbonates, polyolefins, including polyethylene, polyethylene terephthalate, polypropylene, vinyl plastics such as polyvinyl difluoride (PVDF), and cellulose esters such as cellulose nitrate, cellulose butyrate and cellulose acetate.

In particularly preferred embodiments, the material comprises a polycarbonate material. Polycarbonate materials are preferred because they have outstanding impact resistance and toughness. They also have high tensile and structural strength. Commercial polycarbonate materials are produced in various countries and are sold under the trade names LEXAN® distributed by the General Electrics Company, located in Pittsfield, Mass., MERLON™ distributed by the Mobay Chemical Company located in Baytown, Tex., MAKROYLON® distributed by Bayer Corporation located in Pittsburgh, Pa., JUPILON distributed by Mitsui and Co., located in Brussels, Belgium., and PANLITE® distributed by Teijin Chemicals, Ltd., located in Irvine, Calif. and Atlanta, Ga.

Any bombarding procedure can be used to bombard the film of material with energy particles. This process can be carried out in air or in a vacuum. Devices for performing bombardment of materials with high-energy particles are well known in the industry. Typical bombarding procedures include the use of charged particle accelerators. Accelerators are generally classified as falling within two types—electrostatic accelerators and high frequency accelerators. Van de Graaf accelerators and Tandem accelerators are examples of electrostatic accelerators. Electrostatic accelerators are generally capable of producing energies of between 10 KeV and 10 MeV. High frequency accelerators are characterized by an ion beam, which encounters the same acceleration voltage several times.

High frequency accelerators are generally classified into two sub-types—linear accelerators and cyclic accelerators. Linear accelerators employ a linear array of gap electrodes to accelerate a successive passage of ions. A Wideroe and Alvarez accelerator is an example of a linear accelerator. Cyclic accelerators employ magnetic deflection for recycling particles through an accelerating gap subject to high frequency voltage. Cyclotrons and synchrotrons are examples of cyclic accelerators. Cyclic accelerators are capable of producing energies between 10 MeV and a few GeV, but may attain even higher energies.

The particular type of energy particles used will depend on the film of material being bombarded, as some films are more easily damaged than others. Typical energy particles include but are not limited to ions such as argon and oxygen ions; self-fissioning isotopes such as californium-252; isotopes which decay by the emission of alpha particles, such as radium-226 and americium-241; materials such as uranium-235 which fission and emit fission fragments when irradiated with neutrons; materials such as boron-10 which emit alpha particles when irradiated with neutrons; and various atomic and sub-atomic particles. It should be noted that fission fragments, and ions heavier than oxygen such as argon, will form tracks of damaged material in most solids. Oxygen ions are effective with polymers such as the polycarbonates, whereas alpha particles are operable with the more easily damageable polymers such as the cellulose esters.

Any suitable etchant and/or etching procedure can be used to etch the damaged tracks into pores. Typical etchants include sodium hydroxide, potassium hydroxide, lithium hydroxide, chromic acid, potassium permanganate, ammonium hydroxide, potassium t-butoxide, tetrapropyl ammonium hydroxide, and mixtures thereof. While any suitable solution concentrations may be used, a concentrated solution is generally preferred for more rapid track enlargement.

Similarly, while the etching solution may be used at any suitable temperature, it is generally preferable to heat (but not boil) the solution to increase the rate of track enlargement. Good results are obtained for polycarbonate, for example, with about 6-normal solution of sodium hydroxide at about 80° C., with stirring or agitation of the solution during treatment. Where small pore diameters are desired or to allow sufficient etching time for adequate quality control, a lower temperature may be desirable.

The material may be treated with the etching solution for any suitable time period. Where the period is too short, the tracks may not have a sufficient diameter for the intended use, while too long a treating period may allow the solution to attack the body of the sheet excessively. The optimum time period will vary, of course, depending upon the sheet material, the etchant, desired pore size and the solution concentration and temperature. Typically, with a polycarbonate sheet, developed in a 6-normal sodium hydroxide at about 60° C., about 20 minutes in the solution produces fully developed tracks having a diameter of about 0.5 microns.

In certain embodiments, the separator material comprises a commercially available track-etched membrane. Commercially available track-etched membranes include but are not limited to NUCLEPORE® and CYCLOPORE™ distributed by WhatMan, Inc. located in Newton, Mass., ISOPORE™ distributed by Millipore, Inc. located in Billerica, Mass., PORETICS® distributed by Osmonics located in Minnetonka, Minn., and SPI-Pore™ distributed by Structure Probe, Inc. located in West Chester, Pa.

NUCLEPORE® track-etched membranes are manufactured from high grade polycarbonate film using controlled two-step track-etch technology. These membranes have high chemical resistance and high tensile strength. The NUCLEPORE® membranes are available in film thicknesses ranging from 6 micrometers to 11 micrometers and in pore sizes ranging from 0.0015 micrometers to 12.0 micrometers.

CYCLOPORE™ track-etched membranes are manufactured from pure polymeric films using Cyclotron technology rather than traditional nuclear bombardment. CYCLOPORE™ provides polyester membranes available in a wide variety of thicknesses and pore sizes. They have a high chemical compatibility allowing them to be present in many corrosive fluids. The CYCLOPORE™ polyester membranes are available in film thicknesses ranging from 9 micrometers to 23 micrometers and in pore sizes ranging from 0.1 micrometers to 5 micrometers. The CYCLOPORE™ polycarbonate membranes are available in film thicknesses ranging from 7 micrometers to 20 micrometers and in pore sizes ranging from 0.1 micrometers to 12 micrometers.

ISOPORE™ track-etched membranes are manufactured from polycarbonate membranes. These membranes are available in film thicknesses ranging from 6 micrometers to 22 micrometers and in pore sizes ranging from 0.05 micrometers to 12 micrometers.

PORETICS® track-etched membranes are manufactured from polyester membranes. The membranes are produced through a two-step proprietary process. In the first step, thin polyester or polycarbonate film is exposed to collimated, charged particles in a nuclear reactor. As these particles pass though the membrane, they leave tracks. In the second step, the tracks left by the particles are dissolved with an etching solution into cylindrical pores. These membranes have a high range of chemical compatibility, making them resistant to most commonly used chemicals. These membranes also have a superior tensile strength of 207 bar. Both the PORETICS® polyester (PETE) and polycarbonate (PCTE) membranes are available in film thicknesses ranging from 6 micrometers to 11 micrometers. The polyester membranes are available in pore sizes ranging from 0.1 micrometers to 14 micrometers and the polycarbonate membranes are available in pore sizes ranging from 0.01 micrometers to 20 micrometers.

SPI-Pore™ track-etched membranes are manufactured from polycarbonate membranes. These membranes are available in a film thicknesses ranging from 3 micrometers to 11 micrometers and having pore sizes ranging from 0.1 micrometers to 20 micrometers.

Preferably, the track-etched membrane has a thickness suitable for use in a capacitor as a separator material. The range of thicknesses of a separator base 60 typically available for utilization in capacitor cells of the present invention is approximately 250 microns or less and preferably between 5–250 microns (or approximately 0.0002–0.01 inches), most preferably 10–50 microns. Optimally, the separator base 60 is thin enough to avoid the swelling or crowding seen with prior separator materials such as kraft paper.

The track-etched material of the types described above can be used as the separator material in any capacitor cell. In certain embodiments, the track-etched separator is used in a battery. For example, the battery may be a lithium battery. In lithium batteries, the anode comprises lithium and the cathode comprises an active material such as, for example, carbon fluoride, a metal oxide, or a metal oxide bronze. More specifically, the battery may be a lithium silver vanadium oxide battery. In this type of battery, the anode is comprised of lithium and the cathode is comprised of silver vanadium oxide. An example of a lithium silver vanadium oxide battery is described in U.S. Pat. No. 6,130,005 to Crespi et al., the entire contents of which are herein incorporated by reference.

In other embodiments, the track-etched separator is used in a capacitor. In one embodiment, the capacitor may be an electrolytic capacitor. More specifically, the capacitor may be an aluminum electrolytic capacitor. In an electrolytic capacitor, both the anodes and cathodes are typically made of aluminum, preferably aluminum foil. Generally, the anode aluminum foils are between about 0.008 to about 0.003 inches thick. For example, in certain embodiments, each anode foil comprises comparatively stiff, high purity aluminum foil about 0.004 inches thick. Likewise, each cathode foil comprises comparatively flexible, high purity aluminum foil about 0.001 inches thick.

Figure 2:
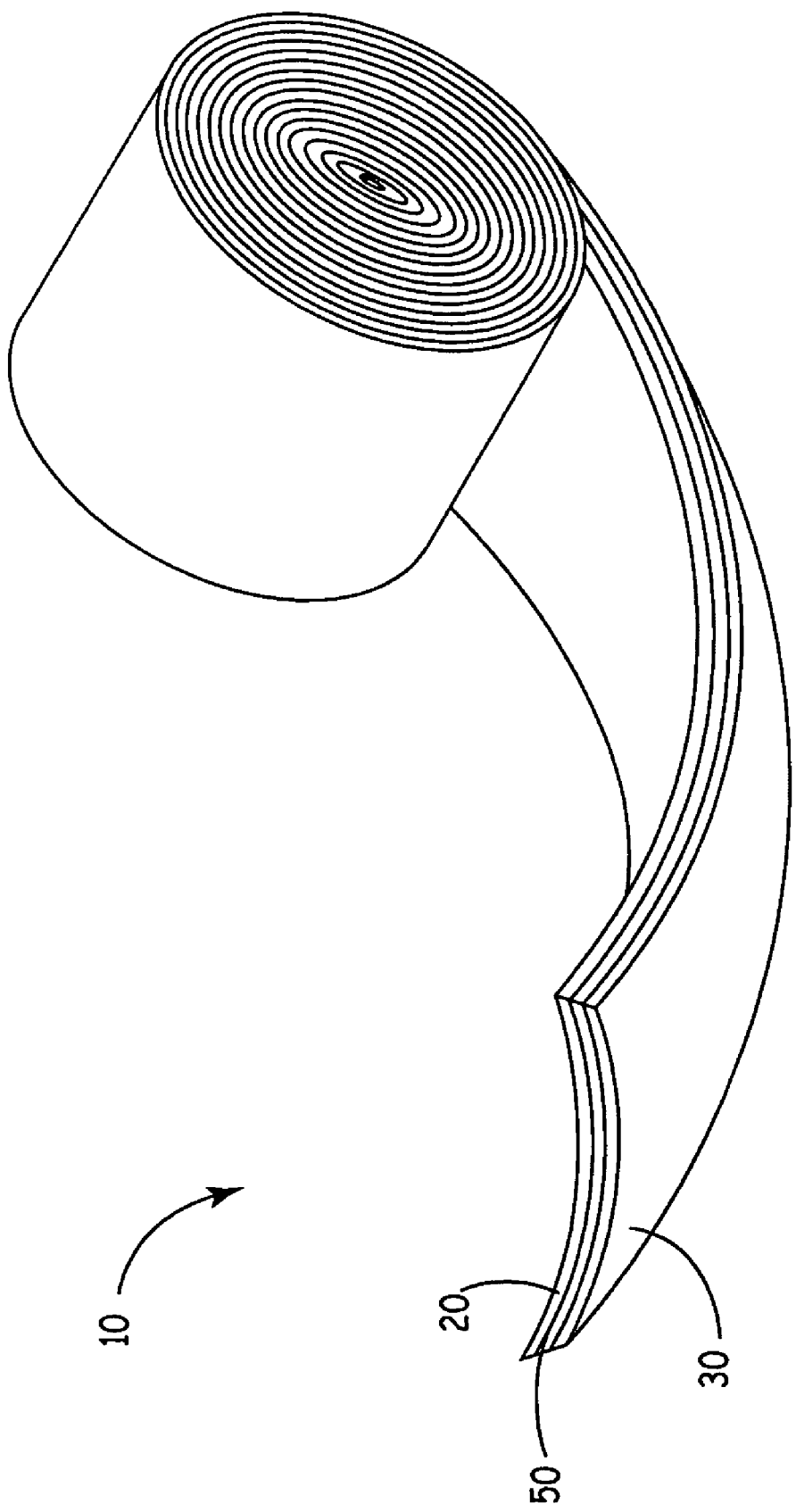
FIG. 2 depicts a perspective view of an anode/separator/cathode laminate partially formed into a circular, coiled position.
Figure 3:
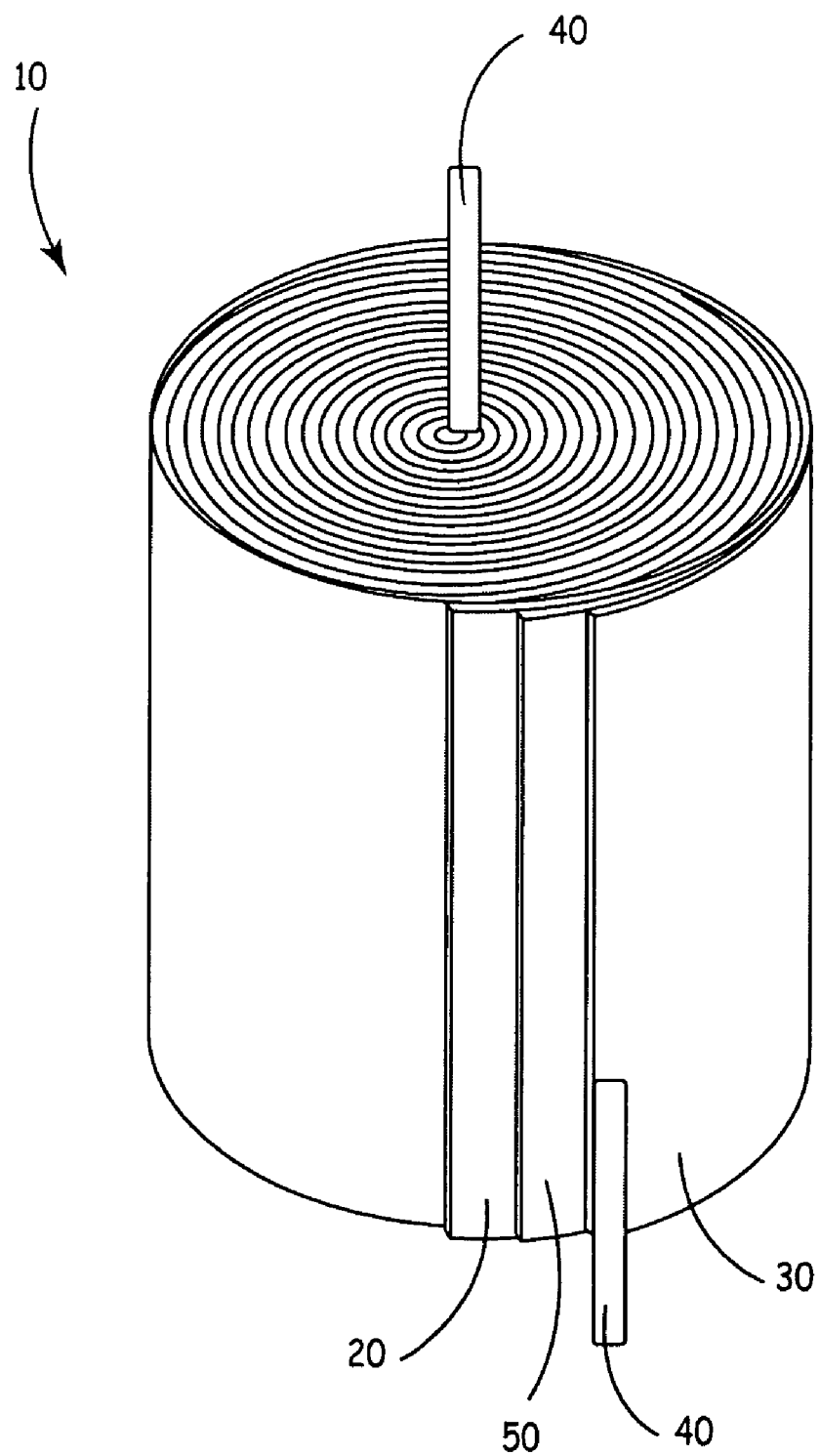
FIG. 3 depicts a perspective view of an anode/separator/cathode laminate completely formed into a circular, coiled position.

Other embodiments of the invention will now be described with reference to the figures. The capacitor cell containing the track-etched separator can be of any suitable configuration, for example a flat or cylindrical configuration. FIGS. 2–3 show a capacitor cell formed in a cylindrical configuration. FIGS. 4–7 show a capacitor cell formed in a flat construction. While the capacitor cell can have any configuration, a flat configuration is preferred because it is typically smaller in design than a cylindrical configuration and capable of operating within small medical devices, such as defibrillators or pace makers.

The anode and cathode layers can be comprised of any electrically conductive anode and cathode material known in the art to be used in capacitor cells. For example, typical anode materials include alkali metals or alkali earth metals selected from Groups IA, IIA and IIIB from the Periodic Table of Elements. For example, these anode materials include but are not limited to lithium, aluminum, sodium, potassium, calcium, magnesium, vanadium, tantalum, niobium or similar alloys or combinations. Likewise, typical cathode materials include electrically conductive metals include ruthenium, vanadium, copper, silver, chromium, bismuth, lead, tantalum, carbon, aluminum, magnesium, titanium, niobium, zirconium, zinc or similar alloys or combinations. These type of cathode materials may be provided with a semiconductive or pseudocapacitive coating. The coating may be an oxide, nitride, carbide, or carbon nitride.

In various embodiments of the present invention, both the anodes and cathodes are made of a metal foil, preferably thin metal foil. Metal foil is particularly desirable because it is easily susceptible to etching and/or forming procedures. Such procedures are done to increase the surface area of the anode or cathode material. An increase in the surface area of either the anode or cathode often improves the performance of the capacitor cell. For example, in a capacitor cell, the anode member (e.g., foil or press, sintered and formed, powdered metal member) is typically designed and/or processed to create a high capacitance per unit area. Typically, the capacity of an electrolytic capacitor is determined by the area of the anode surfaces and the thickness of the dielectric film covering this surface. As a result, an increase in capacity can be obtained if the surface area of the anode layer is increased.

A number of methods have been developed for increasing the surface area of an anode or cathode material. Such methods include but are not limited to sand blasting, mechanical embossing, scratching with rotating brushes, use of abrasive materials, forming in rotary dies, and chemical etching. Each of these methods are well known in the art and any method can be used to increase the surface area of the anode or cathode. Preferably, a chemical etching procedure is used. Optimally, etching dissolves portions of the metal to create a dense network of billions of microscopic tunnels penetrating therethrough.

Figure 4:
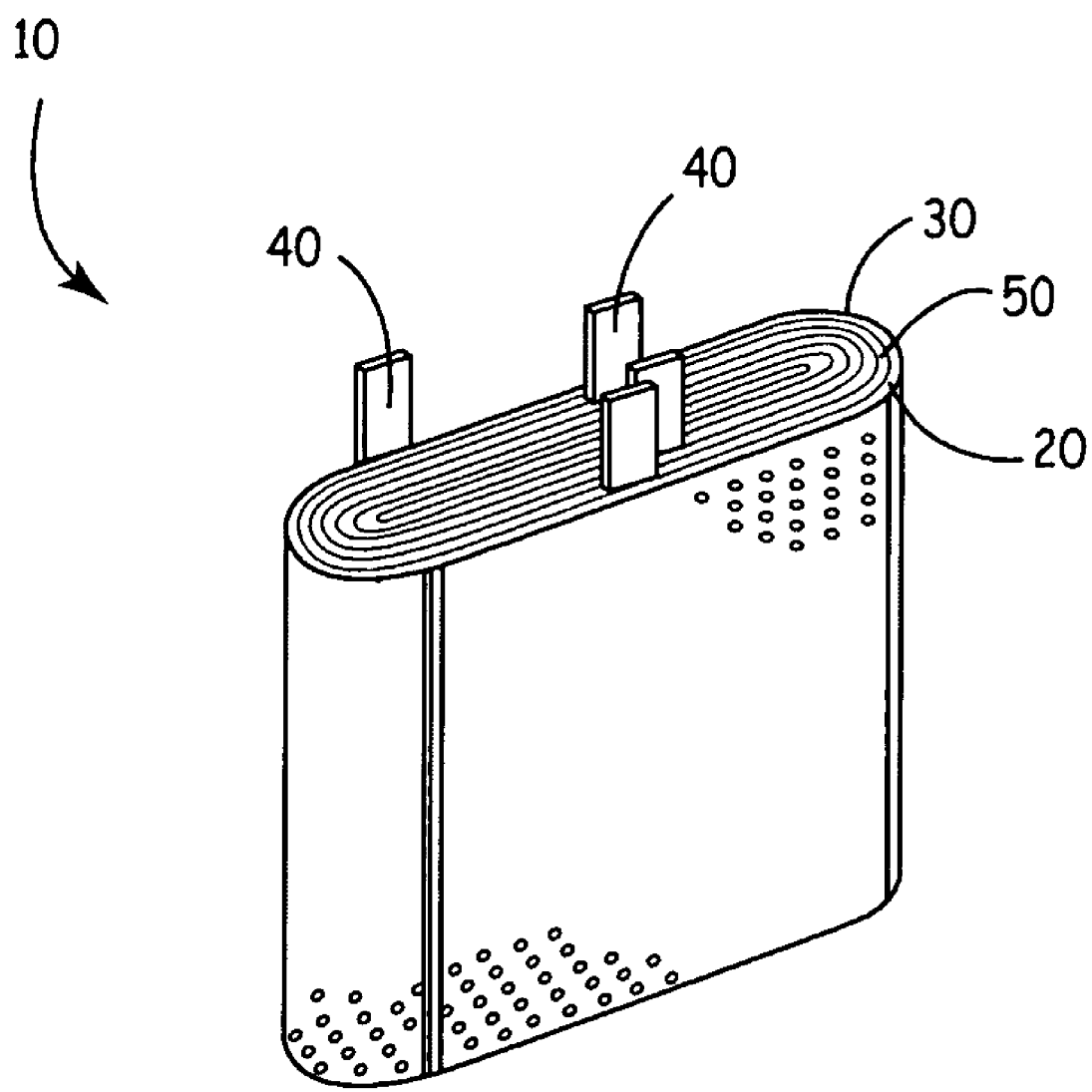
FIG. 4 depicts a perspective view of an anode/separator/cathode laminate formed into a flat, coiled position.
Figure 5:
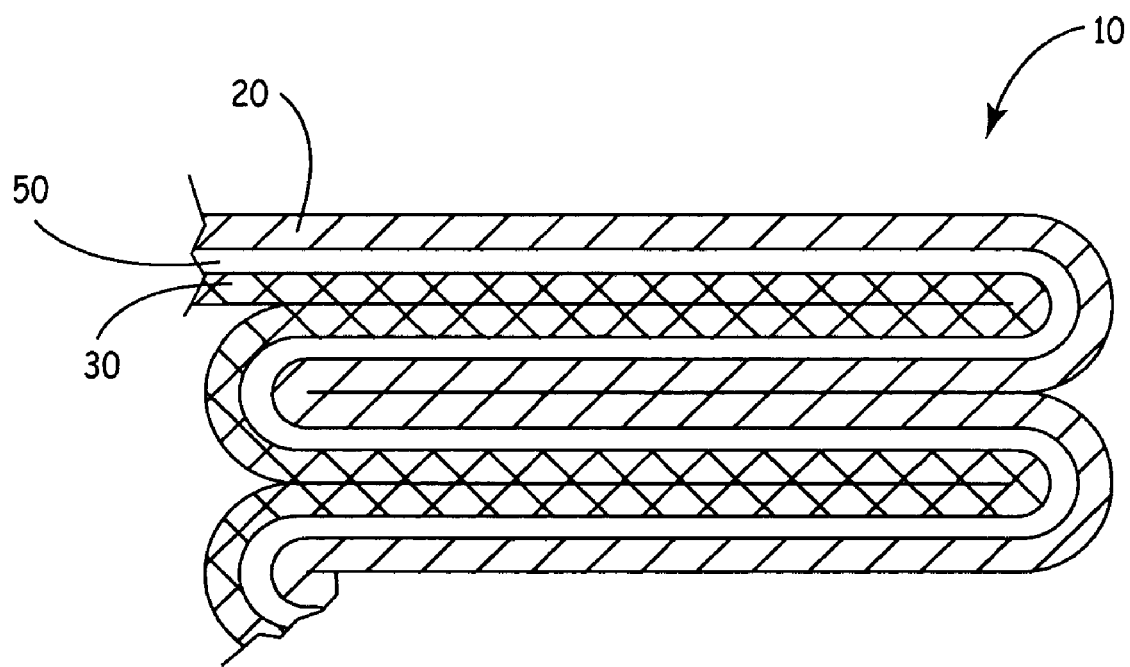
FIG. 5 depicts a side view of an anode/separator/cathode laminate formed into a flat, stacked position.
Figure 6:
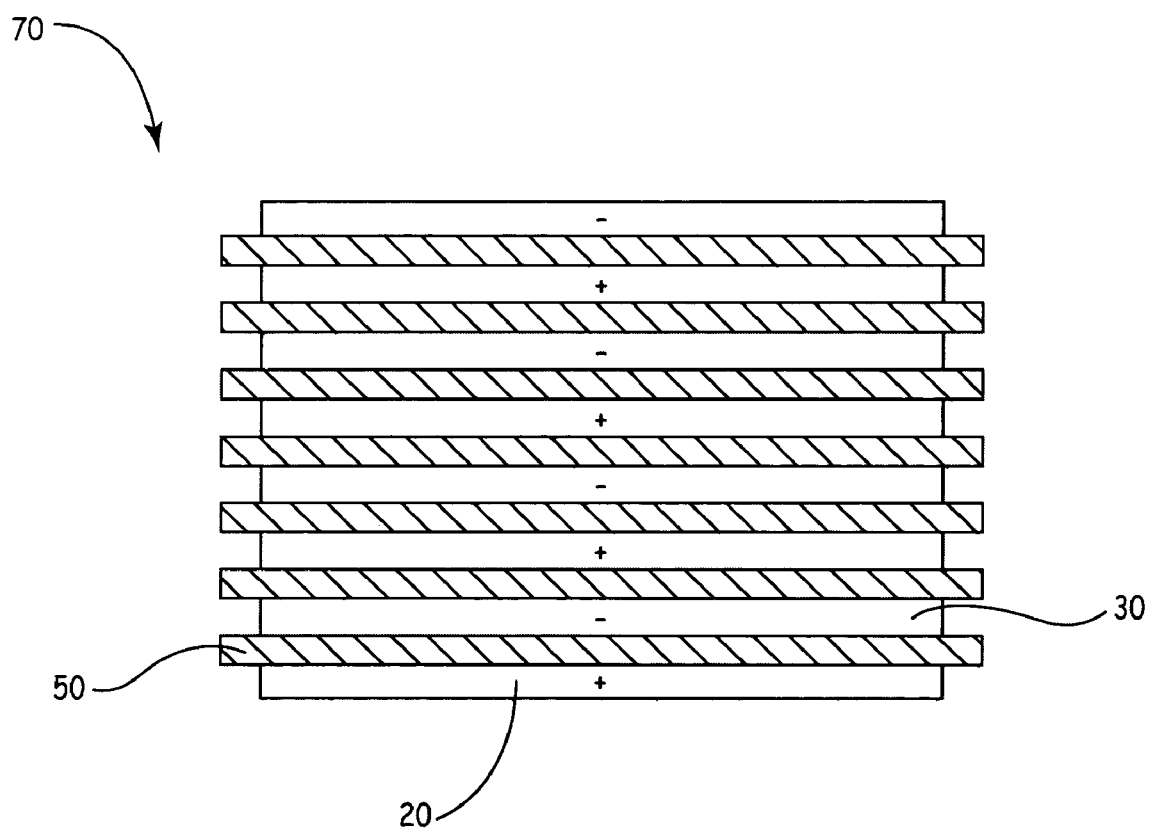
FIG. 6 depicts a side view of layers of separator material positioned between alternating anode and cathode layers.
Figure 7:
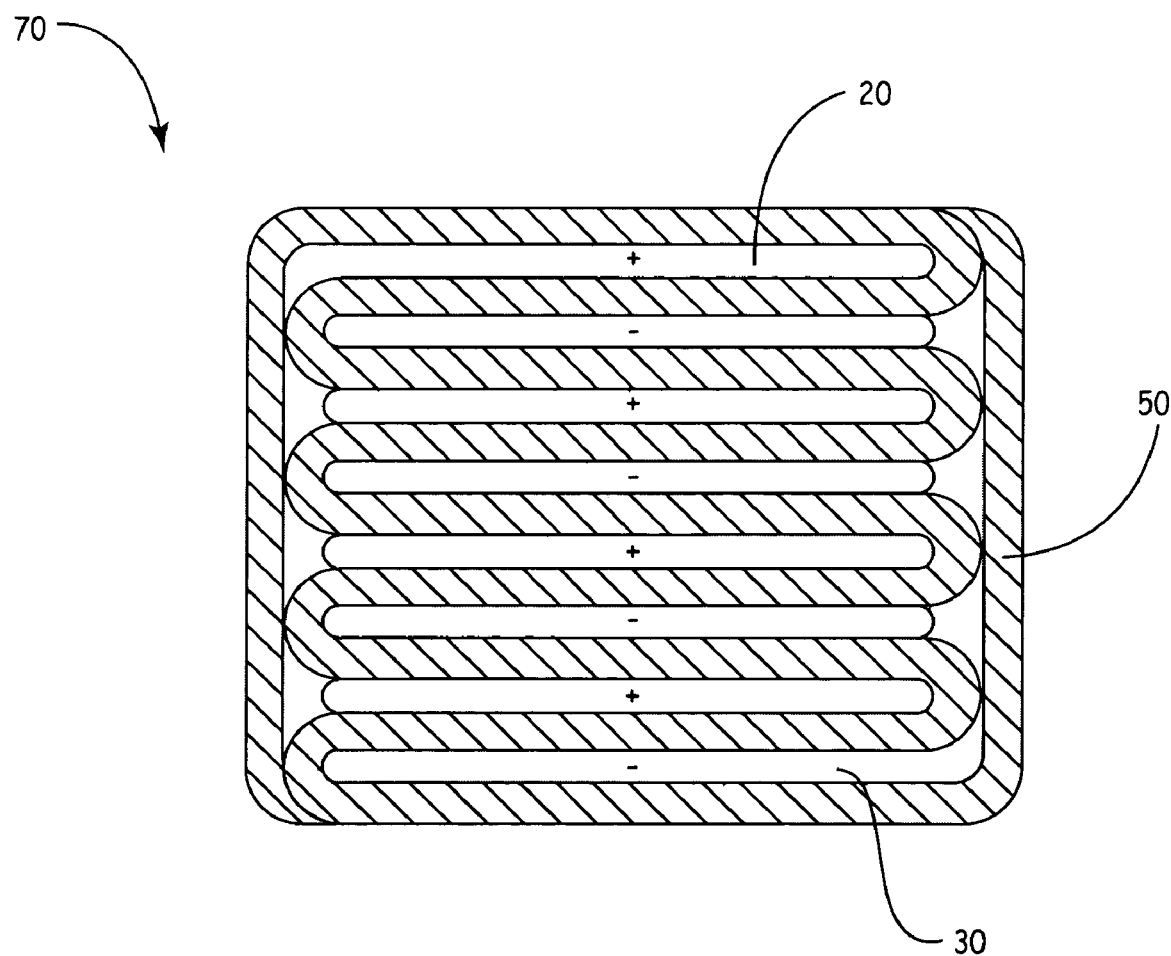
FIG. 7 depicts a side cross sectional view of a strip of separator material wrapped around alternating anode and cathode layers.

The anode, separator and cathode of the capacitor cell can be configured together in any suitable form. For example, in certain embodiments, the anode, separator, and cathode material can be configured together as strips laminated together. In other embodiments, the anode, separator, and cathode material can be configured as separate layers of material. FIGS. 1–5 show the anode, separator and cathode material in a laminate form. FIGS. 6–7 show the anode, separator and cathode material in a layer form.

FIG. 1 shows a portion of an anode/separator/cathode laminate. Generally, the laminate 10 comprises anode material 20, separator material 50, and cathode material 30 adhered together. These materials can be adhered together using any suitable adhesive, for example by using an ion conducting adhesive. The laminate can be made by adhering an anode strip and cathode strip to each side of a track-etched membrane. FIG. 1 specifically shows a laminate having an anode/separator/cathode/separator/anode configuration. However, it should be apparent to one of skill in the art that any number of anode, separator and cathode materials or strips of material can be used to form the laminate.

The laminate 10 can be coiled or wrapped within the capacitor cell in any suitable configuration. For example, FIG. 2 shows a laminate 10 partially wrapped in a cylindrical coil position. FIG. 3 shows the laminate 10 completely wrapped in a cylindrical coil position. Also shown in FIG. 3 are electrical connections 40, each extending from an anode strip 20 and a cathode strip 30. While laminates are typically wrapped in a cylindrical coil position, this is not by any means necessary. For example, as shown in FIG. 4, the laminate 10 can be wrapped in a flat coil position. A flat coil position is particularly desirable as it reduces the space necessary for containing the capacitor cell. FIG. 4 also shows electrical connections 40 extending from anode strips 20 and cathode strips 30.

Likewise, while laminates are often coiled in position, other configurations are available. For example, FIG. 5 shows a laminate 10 configured as a stacked position. Stacked configurations of the laminate 10 may be preferable over coiled configurations in order to optimize packaging efficiency.

FIGS. 6 and 7 show the anodes and cathodes configured as separate layers rather than a laminate sheet. In these embodiments, each anode layer 20 and cathode layer 30 is a substantially rectangularly-shaped segments. However, it should be apparent that the anode layers 20 and cathode layers 30 can be configured in any suitable shape. The shapes of these layers are primarily a matter of design choice, and are dictated largely by the shape, size, or configuration of the enclosure within which the layers are ultimately disposed. Also, each anode layer 20 and cathode layer 30 can be formed into a specific, predetermined shape using a die apparatus, such as that disclosed in commonly owned U.S. Pat. No. 6,006,133 to Lessar et al., the entire contents of which are herein incorporated by reference. The shapes of the layers are primarily a matter of design choice, and are dictated largely by the shape or configuration of the cell enclosure within which those layers are ultimately disposed.

Likewise, the track-etched separator material 10 associated with the anode layers 20 and cathode layers 30 can be configured in any arbitrary shape to optimize packaging efficiency. For example, in FIG. 6, the separator layer 50 is configured as substantially rectangularly-shaped segments that are disposed in between each anode and cathode layer. The separator layers 50 are typically longer than the anode layers 20 and cathode layers 30 to ensure that proper separation is maintained. Alternatively, in FIG. 7, the separator material is configured as one long strip of material that is wrapped around the electrode layers. It should be apparent that the long strip of separator material can be wrapped around the electrode layers in any suitable manner.

While in the embodiments depicted in the Figures, the anodes 20 and cathodes 30 of the capacitor cell are generally configured as single strip (or layer) of metal, in certain embodiments, one or more of the anode strips (or layers) may comprise a double strip or double layer with an electrically conductive strip (or layer) positioned in between. The electrically conductive strip (or layer) may be welded in between the two anode strips (or layers). Preferably, the electrically conductive strip (or layer) is made of aluminum metal.

It should also be understood by those skilled in the art that the length of the anode/separator/cathode laminate used or that the precise number of anode and cathode layers selected for use in a given capacitor cell will depend on the energy density, volume, voltage, current, energy output and other requirements of the device. Similarly, it will be understood by those skilled in the art that the precise number of notched and un-notched anode layers, anode tabs, anode sub-assemblies, and cathode layers selected for use in a given capacitor cell will depend upon the energy density, volume, voltage, current, energy output and other requirements placed upon the capacitor cell.

All of the capacitor cell components are typically sealed within an enclosure (not shown). The enclosure is preferably comprised of a corrosion-resistant metal such as stainless steel or titanium. The enclosure is filled with a liquid electrolyte. In the present capacitor, any electrolyte solution suitable for use with a capacitor cell may be used. In embodiments where the capacitor cell comprises an electrolytic capacitor, the electrolyte contains either a glycerol or glycol, as these render the capacitors operative over a much increased temperature range. For example, in certain embodiments, the electrolyte solution contains ethylene glycol.

In certain embodiments, the capacitor cell includes electrical connections 40 extending from one or more anodes and cathodes. These electrical connections 40 may pass through the enclosure to the outside of the cell. Where the electrical connections 40 pass through the enclosure, they can be sealed against fluid leakage by methods such as adhesive bonding, heat sealing or heat molding.

The present invention also provides methods for making a capacitor cell. The method comprises providing a track-etched separator material of the type described above, and positioning the separator material one or more pairs of alternating cathode and anode plates or layers so that a separation is maintained between the anode and cathodes. In positioning the separator within the cell, it is important to maintain contact and alignment of all anode, cathode, and separator components. Failure in either aspect can lead to short-circuiting or inefficient capacitor performance. Finally, the anode/separator/cathode assembly is enclosed in a case with one or more suitable electrolytes.

Those of skill in the art will recognize that many of the embodiments and techniques provided by the present invention may be used, as applicable, to electrically isolate electrodes of diverse electrochemical cells, such as primary and secondary battery cells. That is, the teaching of the present invention is not to be strictly limited to capacitor cells but should be fairly construed to include other types of electrochemical cells as set forth in the appended claims.

While the invention has been described in conjunction with specific embodiments thereof, it is evident that many alternatives, modifications, and variations will be apparent to those skilled in the art in light of the foregoing description. Accordingly, the preceding disclosure is intended to embrace all such alternatives, modifications, and variations, which fall within the spirit and broad scope of the invention.

What is claimed is:

1. A capacitor cell, comprising:
   a pressed, sintered and formed, powdered metal anode member having a pair of substantially flat, major opposing sides; and
   a portion of track-etch material disposed on at least one of said pair of substantially flat, major opposing sides of said anode member, said portion of track etch material having a surface area approximately the same as a surface area of said anode member.

2. A capacitor cell according to claim 1, wherein said anode member comprises tantalum.

3. A capacitor according to claim 1, wherein said anode member comprises a one of: a D-shaped member, a C-shaped member, an ovoid-shaped member.

4. A capacitor according to claim 1, further comprising a second portion of track-etch material disposed on the other of said pair of substantially flat, major opposing sides of said anode member.

5. A capacitor according to claim 1, wherein said portion of track-etch material comprises a unitary sheet of material and has a surface area approximately twice that of the anode member and wherein said portion of track-etch material is folded around and substantially surrounds said anode member.

* * * * *